US008831632B2

(12) United States Patent
Laws et al.

(10) Patent No.: US 8,831,632 B2
(45) Date of Patent: Sep. 9, 2014

(54) EFFICIENT RESOURCE USAGE FOR LOCATION SHARING IN COMPUTER NETWORKS

(75) Inventors: Kevin Laws, Belmont, CA (US); Michael Judge, Pleasanton, CA (US); Garrett Blythe, San Mateo, CA (US); Kamal Ravikant, San Francisco, CA (US)

(73) Assignee: Kevin Laws, Hillsborough, CA (US)

( * ) Notice: Subject to any disclaimer, the term of this patent is extended or adjusted under 35 U.S.C. 154(b) by 0 days.

(21) Appl. No.: 13/527,472

(22) Filed: Jun. 19, 2012

(65) Prior Publication Data
US 2013/0316726 A1 Nov. 28, 2013

Related U.S. Application Data

(60) Provisional application No. 61/651,983, filed on May 25, 2012.

(51) Int. Cl.
*H04W 24/00* (2009.01)

(52) U.S. Cl.
USPC ............................................ 455/456.1

(58) Field of Classification Search
CPC ............................. H04W 24/00; H04W 64/00
USPC ............. 455/456.1, 456.2, 414.1, 524, 456.3, 455/411, 457, 420; 340/988; 342/451; 701/409, 482
See application file for complete search history.

(56) References Cited

U.S. PATENT DOCUMENTS

| 7,026,984 | B1 | 4/2006 | Thandu et al. |
| 8,050,690 | B2 | 11/2011 | Neeraj |
| 2004/0192352 | A1 | 9/2004 | Vallstrom et al. |
| 2008/0070593 | A1 | 3/2008 | Altman et al. |
| 2009/0005018 | A1* | 1/2009 | Forstall et al. ............ 455/414.1 |
| 2009/0312032 | A1 | 12/2009 | Bornstein et al. |
| 2010/0004005 | A1* | 1/2010 | Pereira et al. ................ 455/457 |
| 2011/0054780 | A1 | 3/2011 | Dhanani et al. |
| 2011/0143777 | A1 | 6/2011 | Kim et al. |
| 2012/0008526 | A1* | 1/2012 | Borghei ........................ 370/254 |
| 2012/0052870 | A1* | 3/2012 | Habicher ................... 455/456.1 |
| 2013/0038490 | A1* | 2/2013 | Garcia ......................... 342/451 |

* cited by examiner

*Primary Examiner* — Kiet Doan
(74) *Attorney, Agent, or Firm* — Vierra Magen Marcus LLP

(57) ABSTRACT

A location sharing system and related processes across computer networks are provided that efficiently utilize resources by adjusting location determination techniques at client devices. A rule-based architecture including user-based heuristics facilitates location determination that is accurate while optimizing resource consumption. Current interest in or other behavior associated with a target user or requesting user can be used in selecting a location determination protocol at the client device. An accurate portrayal of a user's location can be provided efficiently by correlating interest to utilize more accurate but larger resource-intensive components when interest is higher and to utilize less accurate but lower resource-intensive components when interest is lower.

33 Claims, 7 Drawing Sheets

EFFICIENT RESOURCE USAGE FOR LOCATION SHARING IN COMPUTER NETWORKS

PRIORITY CLAIM

The present application claims priority from U.S. Provisional Patent Application No. 61/651,983, entitled "Efficient Resource Usage For Location Sharing In Computer Networks," by Laws, et al., filed May 25, 2012, which is incorporated by reference herein in its entirety.

BACKGROUND

Embodiments in accordance with the present disclosure relate to computer networks, and more particularly to location sharing between computing devices in computer networks.

Many computing devices use location determination to provide location-based services. For example, many devices offer turn-by-turn directions, mapping of nearby points of interest and landmarks, targeted emergency assistance, and location sharing services. Various location determination mechanisms are typically available to mobile devices. For example, a device may include a cellular location service that utilizes cellular information such as the strength of signal from one or more cellular antennas to determine device location using the known location of the antenna. A device may also utilize other network connections, such as a wireless (e.g., Wi-Fi) or wired connection to determine its location using the known location of the wireless network antenna or wired network connection. Satellite-based positioning technology, for a Global Positioning System (GPS) for example, is also included on many devices.

Many mobile devices supplement GPS with technologies such as Time of Arrival (TOA), Enhanced Cell Identification, and Assisted Global Positioning System (A-GPS). For example, A-GPS uses a combination of GPS satellites and cellular network base stations to more accurately and/or more rapidly pinpoint the location of a GPS receiver associated with a mobile device.

Accessing location determination technology by a mobile device may consume a large amount of onboard resources. In situations where a device is used for other traditional features, such as cellular voice features, email and other messaging applications, internet browsers, games, music, etc., application usage of geo-positioning systems may consume an unacceptable level of resources, for example by consuming an undesirable level of battery power.

DETAILED DESCRIPTION

Figure 1:
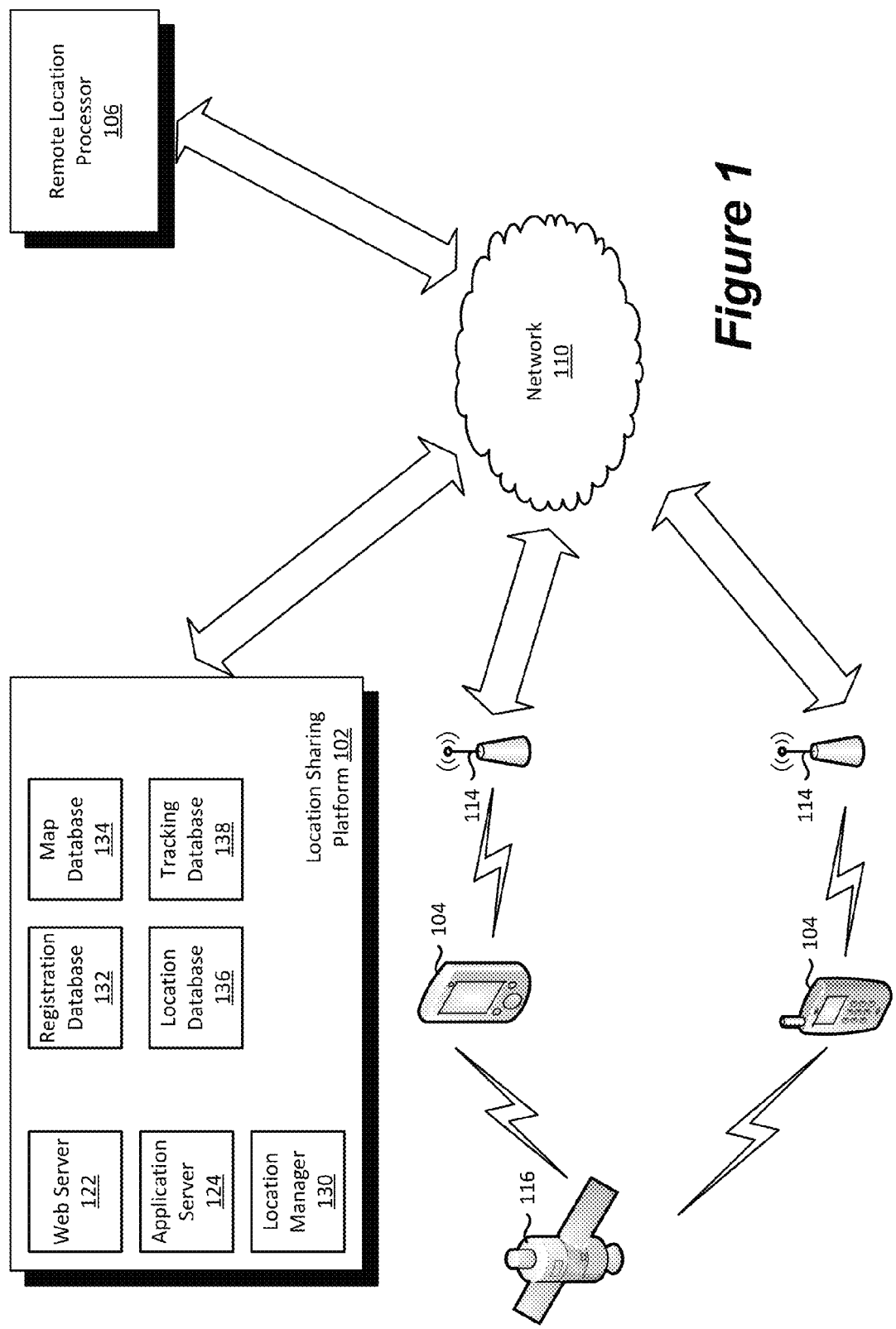
FIG. 1 is a block diagram depicting components of a location sharing system in accordance with one embodiment.

A location sharing system for computer networks is provided that facilitates an accurate determination of computing device location while efficiently utilizing the onboard resources of the device. The determination of device location can be influenced or selected based on user behavior associated with a user of the device, as well as the behavior associated with users of other devices. User behavior can provide an indication of interest in a target user or device, and thereby be integrated into location determination to avoid unnecessary consumption of resources such as battery power for a mobile client device. If the system determines that interest exists for a particular user at a current time for example, a client device associated with the user can be set to a high-accuracy location determination protocol mode to match the interest of other users of the system. If the system determines that interest is less for the particular user, the associated client device can be set to a low-accuracy location determination protocol mode. Other factors, characteristics, and information can be used to switch client devices between different location determination protocols in the system.

In accordance with one embodiment of the presently disclosed technology, a client device includes at least two position determination mechanisms. For example, the client device may include a network-based location determination mechanism that utilizes cellular connections or other network (e.g., LAN, WAN) connections to determine a location of the client device. The device may also include a satellite-based location determination mechanism such as a global positioning system (GPS) to determine a location of the client device. The location sharing system may switch the client device between the network location protocol and the satellite location protocol based on interest of other users in the location of the client device or subscriber associated with the client device. In this manner, a more accurate location as determined from the satellite protocol can be used when there is interest in the location of a device and a less accurate location as determined from the network protocol can be used when there is no or less interest in the location of the device. This may facilitate less power consumption by using the network protocol when there is no or less interest in the location of the device.

In one embodiment, heuristics of user behavior are used in selecting a location determination protocol. For example, the system may determine from a first user's interaction with a first client device, an indication of interest in a second user at a second client device. The system may determine that the first client device has displayed or otherwise utilized a location of the second user (e.g., on a map or other application). The system may further examine the behavior of the first user based on their interaction with the first client device, for example to determine locations of the first client device that indicate that the first user is moving closer to the second user. The system may further determine a state of the second user, such as whether the second user is actively utilizing the location sharing system or a state of the second client device. Based on heuristics that indicate the first user is interested in the second user and is moving toward the second user, the system may set the second client device into a higher accuracy location determination protocol if not already in a high accuracy mode.

In one embodiment, the first client device includes a location sharing engine that generates location information for the first client device as well as tracking information relating to other users for whom the first user has indicated location interest. A location sharing platform including a processor-based server receives the location information and the tracking information. The platform determines that the tracking information indicates interest in the second user and that the second user is associated with the second client device. The platform provides the tracking information to the second client device indicating interest in the location of the second client device. A location sharing engine at the second client device can utilize the information to determine whether a location determination protocol at the second client device should be changed to determine and report location to the location sharing platform. In one embodiment, the platform may determine that the protocol at a particular client device should be changed and issue an instruction to the device in place of or in addition to the information.

In one embodiment, the tracking information or an instruction can be sent directly from the first client device to the second client device without utilizing the location sharing platform. For example, the first client device can send information indicating an interest in the location of the second client device directly to the second client device. The second client device can use the information to place the location sharing engine into an appropriate location determination protocol. In one embodiment, the second client device may periodically poll the first client device or the location sharing platform to determine tracking information or other indication of interest. The second client device may alternatively receive instructions or information using a push protocol to wake up or activate the second client device and/or location sharing engine at the second client device. The instruction or information can come from either the first client device directly or from the location sharing platform. The location sharing engine can then determine an appropriate location determination protocol.

FIG. 1 is a block diagram of components that can be used to implement a location sharing system between client devices over computer networks in accordance with one embodiment. A location sharing platform (LSP) 102, client devices 104 and a remote location processor 106 are in communication with one or more computer networks 110. Although two client devices and a single remote location processor are depicted, any number of client devices and remote location processors may be included in various implementations. More or fewer than the components may be included in other embodiments.

Network(s) 110 can include any combination of local area networks, wide area networks (WAN), the Internet, and/or any other network. As will be described with respect to specific embodiments hereinafter, network 110 typically includes at least one public network such as the Internet with the various components communicating using well know communication protocols such as HTTP, HTTPs, etc. The various resource requests and messages as described herein can be transmitted using any number of well-known communication and network protocols. They can include a packet, cell, message, or signal used to ask for and receive resources. Some examples include the HTTP communication protocol over a TCP/IP network protocol, HTTPS over SSL, FTP, etc.

Client devices 104 may generally include any type of device such as a personal computer, tablet, PDA, cell phone, or other processor-based computing device. Typically, the client devices will be mobile devices but in some cases a non-mobile client device may be used, such as to inquire as to the location of other users or as an update to a user's current location at a non-mobile device. In many examples, the mobile devices are integrated with receiver/transmitter technology so that they can send and receive telephone calls or other messages via a network. Mobile devices include cellular telephones, palmtops, pocket computers, personal digital assistants, personal organizers, personal computers (PCs), and the like. Although described herein in combination with client devices 104, alternative embodiments can be used with any number of computer systems, such as desktop computers, other hand-held devices, laptop or notebook computer systems, multiprocessor systems, micro-processor based or programmable consumer electronics, network PCs, mini computers, main frame computers and the like. Reference to mobile devices is made hereinafter by example but it will be understood to include reference to other devices except where noted.

In FIG. 1, mobile devices 104 are in communication with a transceiver 114 such as an antenna provided a telecommunications operator that may provide services to both fixed and mobile devices. Operator systems can provide access to networks 110 through operator mobile and IP networks, for example. Such systems may include an interface network (IN) server, an OMA server, and a cloud server, for example.

In various embodiments, client devices 104 may include position or location determination functionality. For example, devices 104 may utilize a cellular network-based location determination protocol to determine location using cellular network ground station antennas. They may also utilize wired or wireless network connections to determine location using known locations of networks or network access points. Distance to an antenna, strength of signal, etc. from/to an antenna may be used to determine a position or location based on a known position of the antenna. The location determination may be done locally by the client device, remotely or using a combination of these techniques An optional remote location processor 106 is depicted, which may receive information indicating a cell tower connection and determine a device's location. This information may be provided back to the mobile device or to platform. In other examples, the remote location processor may provide information to the client device from which it can determine location. Generally, cellular location protocols provide about a 500 meter to 1,500 meter accuracy and consume a large amount of battery power. Wi-fi connection protocols, for example, provide about a 50 meter to 200 meter accuracy and consume much less battery power than cellular network protocols.

Mobile devices 104 are also in communication with one or more satellites 116 and optionally, one or more ground station terminals (not shown). Mobile devices 104 may include on-board circuitry and/or software for communicating (uni-directional or bi-directional) with the geo-positioning satellites 116 for location determination. The on-board circuitry, such as a GPS processor and transceiver, may be configured to receive satellite data and to calculate position or location using the data. The mobile devices may operate in any of these modes independently or in combination with each other. For example, in an A-GPS mode the mobile device can use cellular connection information and satellite data to determine location. Satellite location protocols generally offer 5 meter to 15 meter, or even better, accuracy, but consume a larger amount of battery power than that consumed by most cellular location protocols.

Location sharing platform 102 includes one or more web servers 122 and one or more application servers 124 for providing location sharing services to mobile devices 104 over networks 110. Application server 124 implements a location manager 130 that receives and processes information from mobile devices 104 and/or remote location processors 106 to provide location-based information to the mobile devices. Web server 122 provides a web-based interface to mobile devices 104, such as by using standard HTTP or HTTPs protocols, although any suitable communication protocol may be used. In one example, the web server provides a graphical user interface. In other examples, the web server provides a communication interface without a graphical component.

Location manager 130 is in communication with a registration database 132 that stores subscriber account information, such as account names, passwords, preferences, permissions, characteristics and other information of the user. Data structures and objects or other techniques can be used to manage information relating to the subscribers or users of the location sharing system. In one example, the users of the mobile devices form a group or other set of individual users who desire to interact and share location information. A user may set a preference to be supplied with location information for a particular user. The user may set a permission to allow another user to view their location information. Through these preferences and permissions, social or other groups can be defined and enable location sharing between users in the group. Each parameter or characteristic for each user is stored in the registration database.

Map database 134 may store one or maps to provide a map platform over which location information may be displayed using position information as described herein. In one embodiment, the map database provides background maps or images that can be provided to and displayed on client devices 104. Various maps may be included so that different views, for example corresponding region around the viewing user or around a target user can be provided. Map tiles including image files with different granularity levels are used in one example. This may facilitate views at world, continent, region, country, street, etc. The maps may be stored locally or remotely in a map database 134, and be provided by the platform 102 to the appropriate mobile device 104. Third party map providers may also be used.

Location database 136 stores position or location information for the subscribers of location sharing services. Location information may include, but is not limited to, latitude, longitude, current location, altitude, position fix information, sector-based position location, position uncertainty information, device orientation, heading information, velocity (horizontal and/or vertical vector). Tracking database 138 stores tracking information describing the relationships between users, such as who a particular user is tracking and the status of the user and current interest level in the other user. The tracking information may include an identification of users a user is currently tracking. This information may include the user's identification and optionally additional information. For example, the tracking information may include a level of interest in the target user at that time, how accurate a position is being requested for the target user, etc. By including tracking information that indicates interest in the users by other users at a current time, the location sharing system may efficiently determine location information while minimizing power consumption by the client devices.

Although databases are used for data storage in FIG. 1 other data storage techniques may be used. For example, the information may be maintained in flat files or other data structures, including unstructured schema-defined data. Embodiments may also be practiced in distributed computing environments where tasks are performed by remote processing devices that are linked through a communications network in a distributed computing environment, with programs located in both local and remote memory storage devices. Although specific components and software modules are depicted, it will be apparent that numerous physical and software based configurations may be employed while remaining within the spirit of the present disclosure. Generally, software and program modules as described herein include routines, programs, components, data structures, and other types of structures that perform particular tasks or implement particular abstract data types. Hardware or combinations of hardware and software can be substituted for software modules as described herein.

It is noted that embodiments can be implemented within the client devices 104 without a location sharing platform 102. For example, client devices 104 can communicate with another to pass tracking and location information directly without using the LSP 102.

Figure 2:
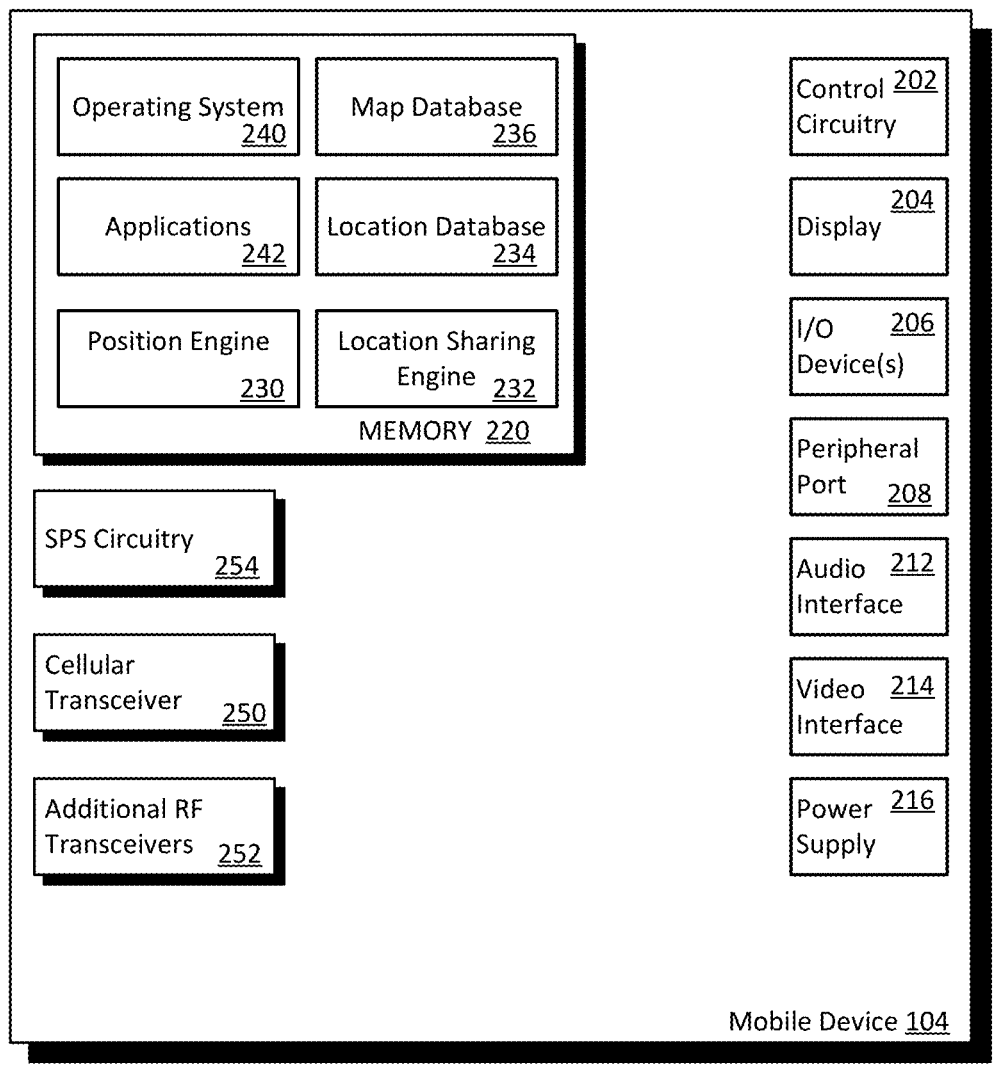
FIG. 2 is a block diagram of a client device including a location sharing engine in accordance with one embodiment.

FIG. 2 is a block diagram of an example of a mobile device 104 that can be used to implement embodiments of the disclosed technology. Typical electronic circuitry is described with a location sharing system for determining location information, receiving location information from location sharing platform 102, and providing location information to LSP 102. Mobile device 104 can be used to implement a phone such as a smart phone or other device that can run one or more applications such as, for example, browser, email, scheduling, instant messaging, and media player applications.

Mobile device 104 includes control circuitry 202, memory 220, display 204 and I/O device(s) 206 connected to one or more data buses (not shown). A peripheral device port 208 is provided for connecting to various peripherals. The control circuitry 202 includes one or more microprocessors. Memory 220 typically includes both non-volatile memory such as ROM and volatile memory such as RAM. Memory 220 stores processor-readable code which is executed by one or more processors of the control circuitry 202 to implement various functionality described herein. I/O device(s) 206 may include any number of input/output devices, such as a rollerball, push button numeric dialing pad, etc. In one example, a separate I/O device may not be included in the mobile computing device such as where a touch screen or stylus is used. Power supply 216, which can include one or more batteries and/or an external power source, powers the various components of the mobile device. In one example, a mobile device 104 is a cell phone, personal digital assistant, handheld computer, or the like including a touch screen display and input buttons to allow the user to enter information into the mobile device. In other embodiments, the mobile device may incorporate more or fewer input elements, for example, the display may not be a touch screen in some embodiments. The mobile device may also include a keypad, such as a physical keypad or a "soft" keypad generated on the touch screen display.

The control circuitry further communicates with audio interface 212 and video interface 214. Audio interface 212 may be used with a speaker to provide audible signals to a user and a microphone to receive audible signals from the user, such as to facilitate a telephone conversation. Video interface 214 enables operation of an on-board camera to record still images, video streams, and the like, and further enables video for display 204.

Operating system 242 is resident in memory 220 and executes on control circuitry 202. Various operating systems can be used. By way of non-limiting example, the operating system may iOS from Apple, Inc., Blackberry OS from RIM, Inc. or Windows Mobile OS from Microsoft. One or more applications 242 are loaded into memory 220 and run on or outside of the operating system. Examples of application programs include phone dialer programs, e-mail programs, PIM (personal information management) programs, word processing programs, spreadsheet programs, Internet browser programs, and so forth.

The control circuitry 202 communicates with cellular transceiver 250 which in turn is coupled to an antenna (not shown) to transmit and receive radio frequency communications. The control circuitry controls transmission and reception of wireless signals. During a transmission mode, the control circuitry 310 can provide a voice signal or data signal to the transmit/receive circuitry of the cellular transceiver. The transmit/receive circuitry transmits the signal to a remote station (e.g., a fixed station, operator, other cellular phones, etc.) for communication through the antenna. Transmissions to and from the cellular transceiver 250 can be conducted under control of the operating system 240. Communications received by the cellular transceiver may be disseminated to applications 242 via the operating system 240, and vice versa. During a receiving mode, the transmit/receive circuitry receives a voice or other data signal from a remote station through the antenna. A received voice signal is provided to the speaker while other received data signals are also processed appropriately.

Additional RF transceivers 252 can interface with control circuitry 202 to facilitate communications with external systems such as intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks.

Satellite position system (SPS) circuitry 254 may implement one or more satellite-based location determination techniques. For example, the SPS circuitry may implement GPS or A-GPS technologies in one example, although other types of satellite-based location determination technologies may be used. In one example, the SPS circuitry may implement a GPS engine to provide location determination capabilities for the mobile device. The position engine may be implemented as hardware, software or software operating with hardware (e.g., a GPS receiver) to receive and process satellite signal for location determination.

Position engine 230 interfaces with SPS circuitry 254, cellular transceiver 250 and/or additional RF transceivers 252 for determining a location of mobile device 104. Position engine 230 may access the SPS circuitry which receives signals from SGS satellites 116 to determine a location of the mobile device using GPS or AGPS protocols. The position engine 230 may also access any of the RF transceivers to interface with cellular network based systems (transceiver 232), including nodes, location transmitters and/or beacons, wireless network transmitters and receivers (transceivers 234), combinations thereof, and the like. With transceivers 250 and 252, the position engine 230 may use techniques such as cell global identity (CGI) with our without timing advance, enhanced forward link trilateration (EFLT), time different of arrival techniques (TDOA), and the like to determine the mobile device's location. The position engine 230 may further access one or more remote location processors 106 using one of the transceivers to determine a location of the mobile device from or using information provided by the remote location processors.

Location sharing engine (LSE) 232 facilitates location determination and sharing between the local client device and one or more other client devices. In one embodiment, LSE 232 receives location information from the location sharing platform (LSP) for one or more of the other client devices or directly from the client devices. The location information of the other client devices can be stored locally in location database 234 in one embodiment, along with user information associated with those devices. The stored information can include a history of locations in one example, to facilitate tracking or other processing. In other examples, the LSE 232 can maintain this information in main memory without using database 234.

LSE 232 facilitates the use of the location information, for example, by displaying the location information at the client device or providing the information to other applications 242 through an application programming interface of the LSE 232. In one embodiment, LSE 232 interfaces with a map database 236 that can provide background, image or other maps over which can be displayed the location of the local mobile device or any number of remote mobile devices. In one embodiment, the maps are not stored locally but are provided by the LSP 102 or a third-party provider.

LSE 232 generates tracking information to indicate any remote users the local user is tracking. For convenience, the terms local user (device) and remote user (device) are used to differentiate between a local user or device generating tracking information relating to one or more users, and the remote users or devices indicated in the tracking information.

In one embodiment, the tracking information is generated by determining which users have a location currently within a display view provided by the LSE. LSE 232 may make other determinations as well, such as a level of interest in a particular user. This may be based, for example, on whether the subscriber has actively selected that user on the display or whether the subscriber has provided other information indicating interest, such as by determining that the subscriber has adjusted the display so that particular user remains in view. LSE 244 provides the tracking information to LSP 102 for use by the location manager or directly to one or more of the other appropriate client devices.

LSE 232 also interfaces with the position engine 230 to receive location information for the mobile device 104 and to provide that information to LSP 102 or the mobile devices 104 of other users. LSE 232 implements a rule-based architecture for how the location of the local mobile device is determined. This architecture addresses resource consumption for location determination by utilizing different location determination techniques based on user behavior. In one embodiment, the location determination technique may be based on the user behavior of the local mobile device. In another embodiment, however, the location determination technique for the local mobile device is based on user behavior associated with a remote mobile device. For example, the interest of other subscribers in the user of the local mobile device at different times may be used to change the mode of location determination in an effort to balance resource consumption with the relative interest in the local subscriber. LSP 102 may acquire and provide tracking information and/or location information from a remote mobile device to the local mobile device or the local mobile device may receive the information directly. The LSE 244 can use the tracking information to determine a level of accuracy or mode of location determination for the local mobile device. In another example, the LSP 102 can provide an instruction to the LSE 244 of a mobile device to use a particular mode of location determination or to provide a particular level of accuracy of location information. In another embodiment the instruction may come directly from another client device.

Figure 3:
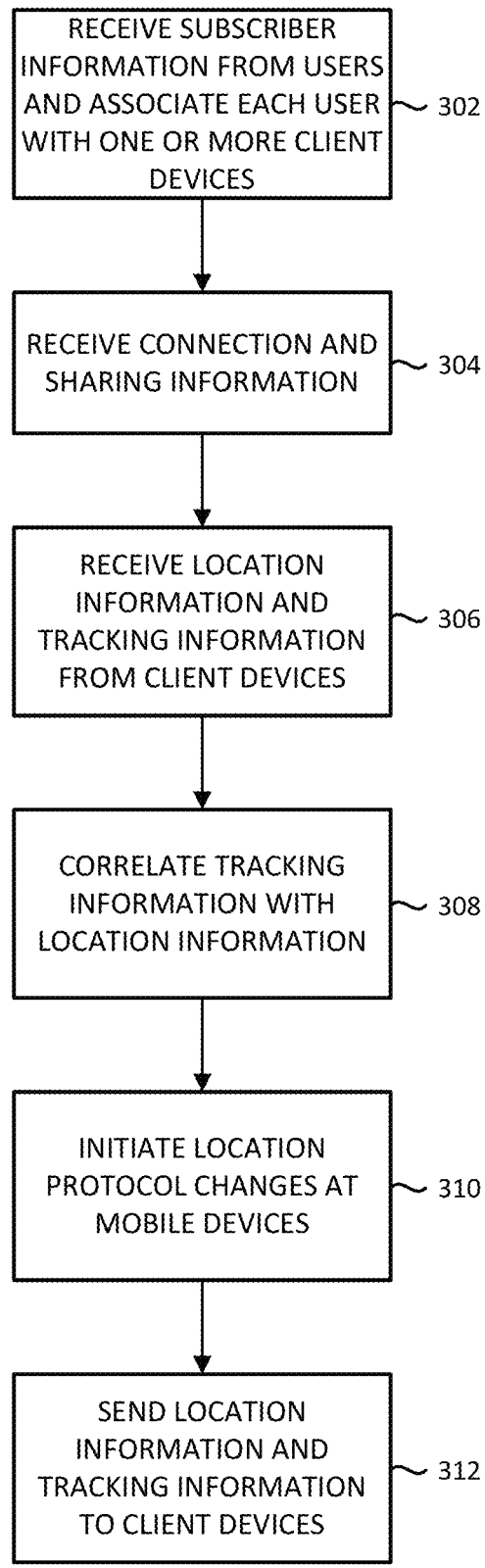
FIG. 3 is a flowchart describing a process of location sharing between client devices in accordance with one embodiment.

FIG. 3 is a flowchart describing a method performed by a location sharing system in accordance with one embodiment.

At step 302, the location sharing system receives subscriber information and associates the subscriber with one or more client devices. Step 302 may include receiving account information such as a username and password for a user and identification information for one or more client devices associated with the user. The system may also receive preferences such as privacy settings or privilege information for the user. The user information may be used to create a user profile.

At step 304, the location sharing system receives connection and sharing information from the subscriber. Connection information includes an identification of one or more users the subscriber wishes to track or from whom the subscriber would otherwise like to obtain location information. The sharing information includes an identification of one or more users with whom the subscriber would like to share their location information. The sharing information may be further partitioned to permit the subscriber to provide different forms or levels of location sharing to different users. For example, the subscriber may specific a level of accuracy or radius of location to share with different users. For instance, the subscriber may specify lower levels of accuracy, such as regional, city, street, or other area for certain users to control the amount of information that is shared. Various privacy and control settings may be provided.

It is noted that steps 302 and 304 may be performed at any time and that user, connection and sharing information may be updated or generated continuously or at initiated intervals. For example, a user may view another user from with a display provided by LSE 244 or another application and select to follow or otherwise track that user's location, thereby updating the connection and/or sharing information.

At step 306, current location and tracking information is received from the users' client devices. Like steps 302 and 304, the location information and tracking information may be received at any time at step 306. The location information indicates the current location (or a history of locations) of a particular (local) client device and the tracking information indicates any remote users or devices being tracked at the local client device. The tracking information may take various forms, for example, simply indicating which remote users location information is being used at the local mobile device. The indication may be of which users' locations are currently within a field of view on the display of the local mobile device. The indication may further provide information relating to a level of interest in each user. For example, if the user is displayed on a map at a street or city level, the indication may be of a high or relatively high interest in the user. If the map is at a regional or country level, however, the indication may be a relatively low interest.

At step 308, the location sharing system correlates the tracking information from each client device with the location information received or already stored in location database 136. The location information is used to generate messages to each mobile device based on the tracking information for that mobile device. In one example, the system accesses a database of available location information for each mobile device corresponding to the tracking information for a requesting mobile device. The system generates a message for the requesting mobile device with the available location information corresponding to each user being tracked at the requesting mobile device as indicated by the tracking information. The information and/or messages may be sent using a location sharing platform or directly between the client devices.

At step 310, the location sharing system initiates location determination protocol changes at the mobile devices based on the correlation of tracking information with location information at step 308. For example, the system can adjust the level of accuracy at a particular mobile device based on the tracking information received from another mobile device. The tracking information received from a first mobile device may indicate that location information for a user associated with a second mobile device is being used at the first mobile device or is being requested by the first mobile device. The LSP, for example, can access the available location information for the second mobile device to determine if any changes to the location determination protocol at the second mobile device are needed. In another example, the second mobile device can initiate a change in protocol based on tracking information it receives from the LSP or directly from another mobile device indicating an interest in the location of the second mobile device.

At step 312, location information is distributed to requesting mobile devices in accordance with the correlation and messages generated at step 308. In one embodiment, a requesting mobile device issues a request to the LSP for location information in the form of the tracking information received at step 306. The LSP can access a database storing location information for each device corresponding to a user indicated in the requesting device's tracking information. The LSP can generate a response with all available location information. Other information may be passed at step 312 as well, such as profile information for the users whose location information is being transmitted. In one example, the LSP may return an indication for any location information that is not available. The LSP may also return an indication of how old or how much time has elapsed since the device's location was updated. The local LSE can indicate on the display of the local mobile device that the location data is old or should be considered unreliable. In one embodiment the location information is distributed directly without using an LSP.

Figure 4:
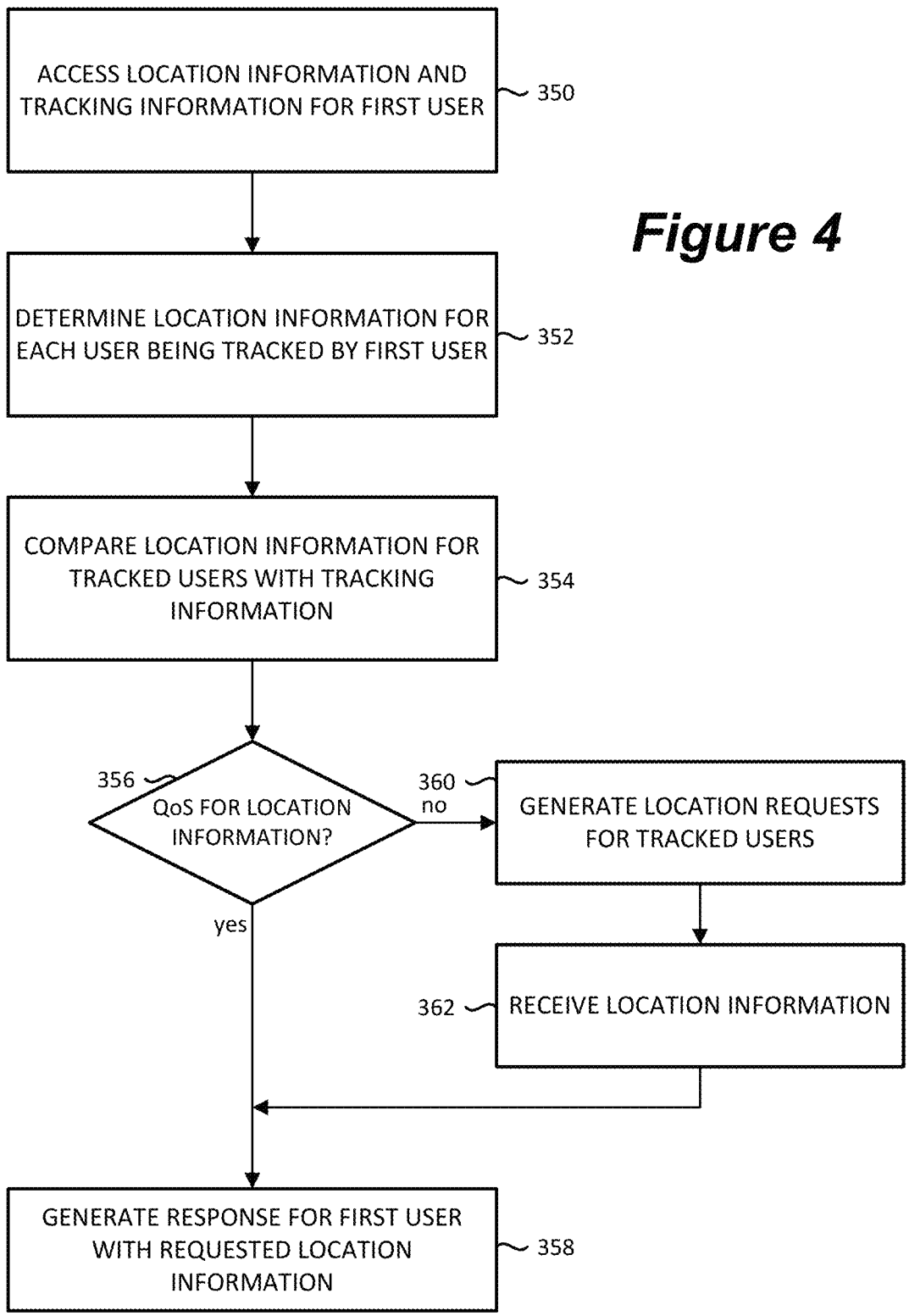
FIG. 4 is a flowchart describing a process at a location sharing platform for location sharing between client devices in accordance with one embodiment.

FIG. 4 is a flowchart describing one embodiment of using tracking information and location information to facilitate location sharing. In one example, the process of FIG. 4 can be performed at step 308 of FIG. 3 by LSP 102. At step 350, the location manager 130 accesses location information and tracking information associated with a first user. Step 350 can be performed at a periodic interval or be triggered by various events. In one example, step 350 begins in response to receiving a message from a client device associated with the first user. The message may include location information for the client device and tracking information indicating one or more remote users for which the first user wishes to obtain location information. In one example, the message is an HTTP request packet including the location and tracking information. The location information and tracking information can be stored in databases 136 and 138, respectively.

At step 352, the location information for the users indicated in the first user's tracking information is accessed. Step 352 can include accessing the location database to determine the location information for each of the remote users. The location manager may also access any information indicating when the location information for a corresponding user was received and what the quality of the location information is. The LSE may also access any profile information or other information maintained for the requested user(s).

At step 354, the location information for each requested user is compared with the tracking information in the first user's request. For example, step 352 may include determining that location information is not available for a requested user. Step 354 may include comparing the location information to quality of service (QoS) standards indicated by the first user's request or profile information. For example, the location manager may compare an interest level for a particular user in the tracking information with information indicating the quality of the requested location information or how long it has been since the requested location information was obtained. Step 354 may further include comparing the location information for each requested user with general or default quality standards. For example, step 354 can include determining that the location information for a particular user is beyond a threshold expiration period. Step 354 can also include accessing tracking information received from the remote users. The tracking information can indicate that the remote user is not actively utilizing location information, for example.

At step 356, it is determined whether the location information for each requested user meets all quality of service standards. If the location information for each requested user meets the standards, a response is generated for the first user's message at step 358. The response includes the requested location information and optionally, profile or other information associated with the target users. For any location information that was unavailable, the LSP provides an indication in one embodiment.

If the location information for each requested user does not meet the quality of service standards at step 356, processing continues at step 360. At step 360, the LSP issues a request to each mobile device for which the location information is not adequate. The request in one example is an instruction to the LSE at the client device to determine a high level accuracy location for the device and to return the information to the LSP. In another example, the request is simply an indication that a particular user is interested in the location of the target client device. For example, the LSP can pass the tracking information or a portion thereof to the remote client device that was received from the first client device. The LSE at the target client device can then determine how to respond. For example, the LSE may determine that the current location determination protocol is sufficient to respond or that the position engine should switch protocols so that the relative interest level can be satisfied. The LSE can access the position engine and determine the required location information if not already determined.

In one embodiment, step 360 includes issuing a push protocol message (e.g., a voice over internet protocol (VoIP) message) to the LSE at the client device. For example, the LSE may register (e.g., with the operating system) of the client device as a voice application. In this manner, the operating system may pass incoming VoIP messages to the LSE. This can be beneficial in situations where the LSE is not active at the target client device, for example where the LSE is not actively executing or has been placed into a background state by the operating system. By enabling the LSE to respond to VoIP messages, the LSE can be activated by the LSP even when the LSE is not currently executing at the target client device. Accordingly, one embodiment includes issuing a VoIP request to the target device at step 358 to activate the LSE at the client device. In one embodiment, the VoIP request includes the instruction to the LSE or the information for the LSE as described above. In another example, the LSE receives the VoIP request and in response, issues a request to the LSP. The LSP can receive the request and respond with the instruction or the information described above. In another example, the step 360 includes responding to a periodic polling request from the target mobile device.

At step 362, the location information from the target client device(s) is received. In one example, step 362 includes receiving a response to the request issued at step 360. After receiving the location information, processing continues at step 358 as described above with the location information including any location information received at step 362.

In one embodiment, the LSP does not compare the location information for the tracked users against quality of service standards. The LSP accesses the tracking information from each incoming request such as that of the first user at step 352. Any available location information can be provided in response to the request with the tracking information. The tracking information or an indication of the interest in a target user is automatically provided to the client device of the target user. The LSP can determine from the tracking database or location database whether the target user's client device has sharing activated. In another example, the LSP can determine whether the target user's client device has issued a request or other message to the LSP within a threshold period. If any of the conditions are met, the LSP can send a message to the target client device so that updated location information can be received.

Figure 5:
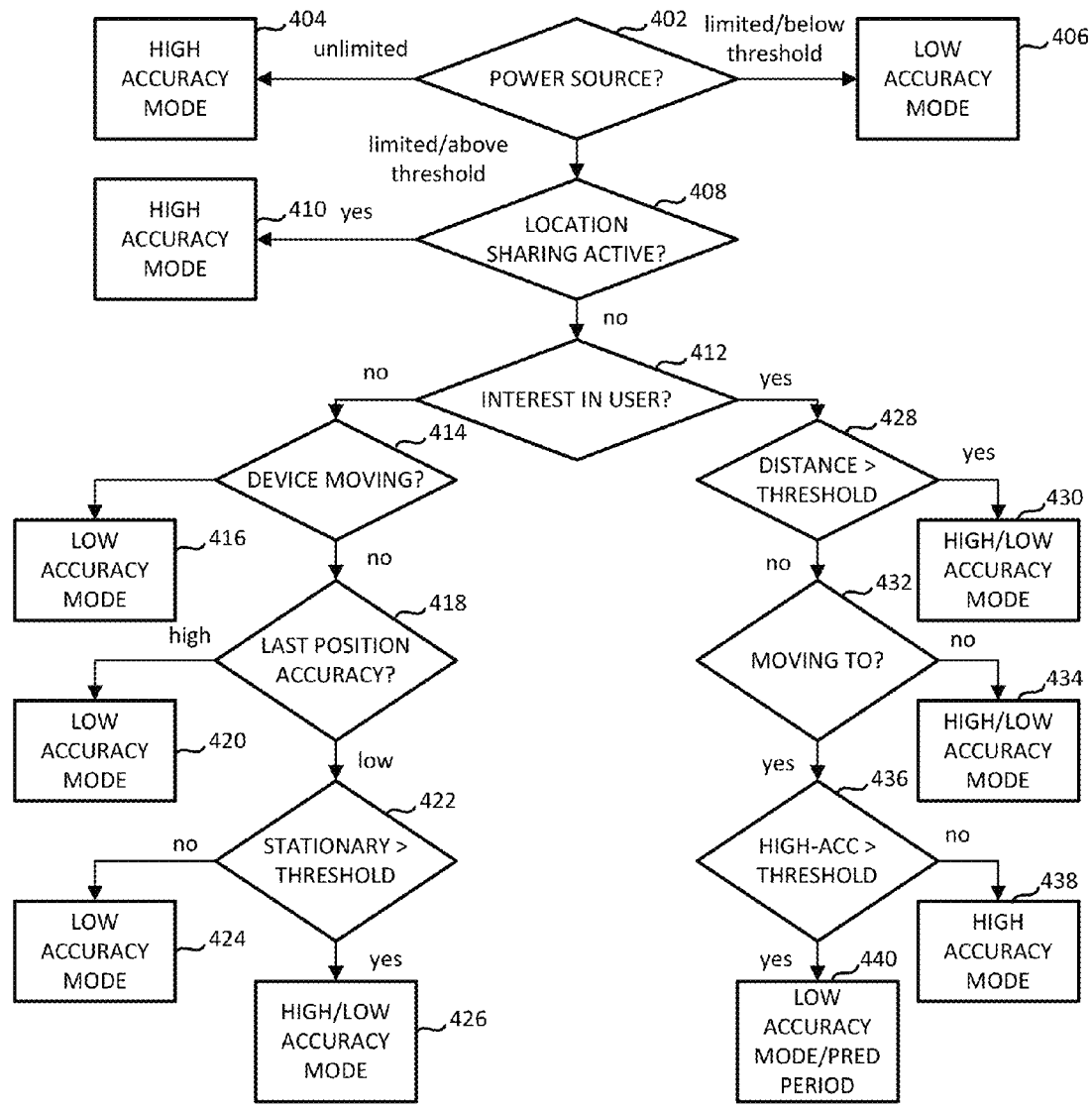
FIG. 5 is a flowchart describing a process at a client device for switching between location determination protocols in accordance with one embodiment.

FIG. 5 is a flowchart describing processing at a client device in one embodiment. In one example, FIG. 5 can be performed by a location sharing engine at a client device as part of initiating a protocol change at a client device, as may be performed as part of step 310 of FIG. 3.

At step 402, the LSE determines the status of the power source for the client device. Step 402 can include determining if the client device has an unlimited, stable power source (e.g., plugged-in) or whether the power source is limited, such as when the device is being powered by a battery. If the power source is limited, the LSE determines the remaining amount of power. If the power source is unlimited, the LSE sets the position engine to a high accuracy location protocol mode at step 404. If the power source is limited and the remaining power is less than a threshold power level, the LSE sets the position engine to a low accuracy location protocol mode at step 406. It is noted that the LSE may simply allow the position engine to remain in the appropriate mode at steps 404 and 406 and elsewhere as described.

If the power source is limited, but the remaining power is above the threshold power level, the client device determines if location sharing is active at the client device at step 408. For example, step 408 can include determining if the location sharing engine is active (e.g., executing) at the client device or whether the LSE has been placed in the background (e.g., minimized or not currently executing). If the LSE is active at the client device, the LSE instructs the position engine to maintain or initiate the high accuracy location protocol at step 410.

If location sharing is not active at the client device, the LSE determines whether there is interest in the location of the user associated with the local client device at step 412. In one embodiment where the LSE is not active at the client device, steps 408 and 412 can be performed in response to a message from the LSP or from another mobile device. For example, the LSP may issue a VoIP message to the LSE after receiving tracking information indicating that another user is interested in the location of the local client device. The LSE may respond by issuing a request to the LSP for the tracking information to make the determination at step 412. In another example, the VoIP message may contain the tracking information or a specific instruction with respect to the illustrated decisions. In yet another example, the LSE may register with the operating system to be notified when the location of the client device changes. When the location changes, the LSE can send an update to the LSP and in return receive any indication of user interest from tracking information of those users.

If there is no interest in the user of the local client device, the LSE determines if the device is moving at step 414. If the device is currently moving, the LSE sets or maintains the position engine to the low accuracy location protocol mode at step 416. If the device is not moving, the LSE checks at step 418 for the accuracy of the last location information determined for the local client device.

If the last location information was obtained using a high-accuracy protocol, the client device sets the position engine to the low-accuracy protocol mode at step 420. If the last location information was obtained using a low-accuracy protocol, the client device determines whether the local client device has been stationary for more than a threshold period of time at step 422. If the client device has not been stationary for more than the threshold period, the LSE sets the position engine to the low-accuracy protocol mode at step 424.

If the client device has been stationary for more than the threshold period, the LSE sets the position engine to a high accuracy location protocol mode until at least one location fix is obtained at step 426. After the position fix is obtained at the high accuracy protocol, the position engine is set to the low-accuracy protocol mode.

Returning to step 412, if there is interest in the user of the local client device, the LSE determines at step 428 whether the requesting user is more than a threshold distance from the current location of the local client device. If the requesting user is more than the threshold distance from the local client device, the client device sets the position engine to a high accuracy location protocol until at least one location fix is obtained at step 430. After the position fix is obtained at the high accuracy protocol, the position engine is set to a low-accuracy protocol mode.

If the requesting user is not more than the threshold distance from the client device, the LSE determines at step 432 whether the requesting user is moving toward the local client device. If the user is not moving toward the local client device, the LSE sets the position engine to a high accuracy location protocol until at least one location fix is obtained at step 434. After the position fix is obtained at the high accuracy protocol, the position engine is set to a low-accuracy protocol.

If the requesting user is moving toward the target client device, the client device determines whether the position engine has been in a high accuracy protocol for more than a threshold period of time at step 436. If the position engine has been in the high accuracy protocol for more than the threshold period, the LSE sets the position engine to a low accuracy protocol for a predetermined period or amount of time at step 440. If the position engine has not been in the high accuracy high accuracy protocol for more than the threshold period, the LSE sets the position engine to the high accuracy protocol at step 438.

Figure 6:
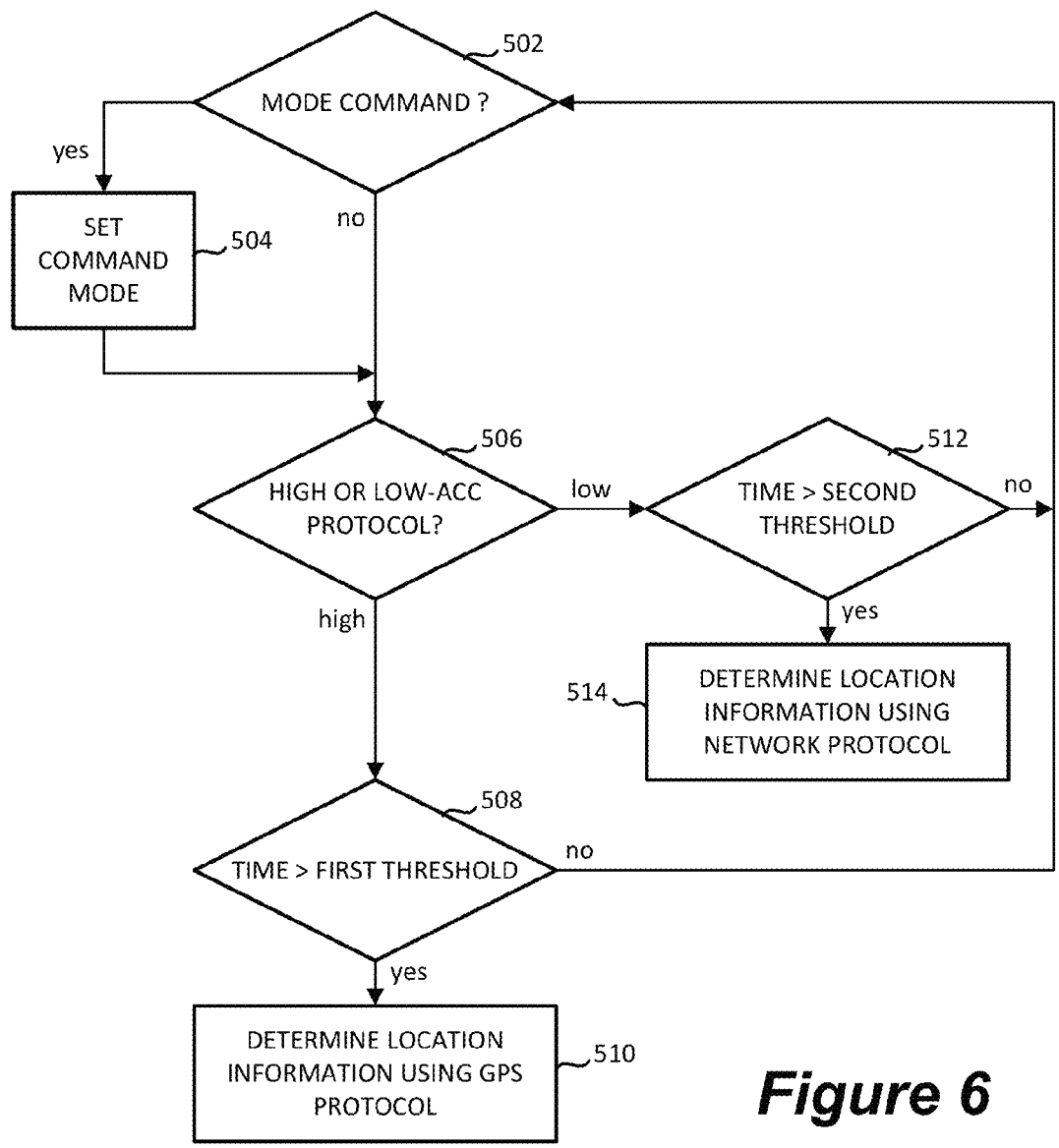
FIG. 6 is a flowchart describing different location determination protocol processing at client devices in accordance with one embodiment.

FIG. 6 is a flowchart describing processing by a position engine to facilitate different location determination protocols in response to user behavior or interest. In one example, the process of FIG. 6 can be performed by the position engine in conjunction with the LSE of a client device as shown in FIG. 5. In other examples, the position engine may switch protocols independently.

At step 502, the position engine determines if the location sharing engine has issued a mode command. If the LSE has issued a mode command, the position engine sets the indicated mode (e.g., high or low accuracy) at step 504. After setting the indicated mode or determining that no command has been received, the position engine determines the appropriate location protocol for the current mode at step 506. If the current mode indicates a high-accuracy protocol, the position engine compares the length of time since the last location determination with a first threshold time period at step 508. If the length of time is less than the threshold period, processing returns to step 502 to determine if a mode command has been issued. If the length of time reaches the threshold, the position engine determines location information for the client device using a satellite positioning system or protocol at step 510. In one example, the position engine accesses GPS circuitry at step 510 to receive satellite positioning signals in order to obtain a high quality position fix. Step 510 may also include accessing the cellular or another RF transceiver to facilitate an A-GPS position fix at step 510, for example.

If the current mode indicates a low-accuracy protocol at step 506, the position engine compares the length of time since the last location determination with a second threshold time period at step 512. In one embodiment, the second threshold period used is longer than the threshold period used for the low-accuracy protocol. In this manner, the high accuracy protocol can utilize a smaller interval between updates to provide a more accurate representation of location. The lower accuracy mode can utilize a larger interval to conserve battery power.

If the length of time is less than the second period, processing returns to step 502. If the length of time is greater than the threshold, the position engine determines location information for the client device using a network-based position system at step 514. In one example, the position engine accesses the cellular transceiver to determine the position using a CGI process at step 514.

Accordingly, one embodiment includes a method of sharing location information between computing devices that comprises determining first location information for a first client device using a first location protocol, receiving tracking information associated with a second client device, determining from the tracking information that the second client device has indicated an interest in the location of the first client device, and in response to the tracking information, determining second location information for the first client device using a second location protocol, the second location protocol having a higher accuracy than the first location protocol.

A method of sharing location information between computing devices is provided in one embodiment that comprises receiving at a server first tracking information and first location information from a first client device where the first location information is obtained using a first location protocol, receiving at the server second location information and second tracking information from a second client device where the second tracking information indicates a set of users being tracked at the second client device, accessing profile information for the set of users and determining that the first client device is associated with a user in the set of users being tracked at the second client device, sending at least a portion of the second tracking information to the first client device to initiate a location determination protocol change at the first client device, and receiving from the first client device location information obtained at the first client device using a second location protocol where the second location protocol has a higher accuracy than the first location protocol.

A location sharing system in one embodiment comprises at least one storage device and at least one location server in communication with the at least one storage device. The at least one location server is configured to receive and store location information and tracking information associated with a plurality of subscribers, determine from the tracking information that a first subscriber has requested location information for a second subscriber, determine a client device associated with the second subscriber, and send at least a portion of the tracking information to the client device associated with the second subscriber to facilitate a change in location determination protocol based on the tracking information indicating that the first subscriber has requested location information for the second subscriber.

A mobile computing device in one embodiment comprises at least one transceiver for communicating over one or more networks, satellite positioning circuitry configured to receive satellite signals, and at least one processor in communication with the at least one transceiver and the satellite positioning circuitry. The at least one processor is configured to receive tracking information associated with requests from a set of client computing devices for location information associated with the mobile computing device, determine location information for the mobile computing device using the satellite positioning circuitry if the tracking information indicates a first interest in location information associated with the mobile computing device, and determine location information for the mobile computing device using the at least one transceiver if the tracking information indicates a second interest in location information associated with the mobile computing device.

A method of location sharing between mobile computing devices in one embodiment comprises associating each of a plurality of users with at least one of a plurality of mobile devices. The plurality of users include a first user associated with a first mobile device. The method further comprises determining whether information has been received from any of the plurality of mobile devices indicating that a current location of the first user is being used at one of the plurality of mobile devices, if information has been received indicating that a current location of the first user is being used, determining location information of the first mobile device at a first accuracy level, and if information has not been received indicating that a current location of the first user is being used, determining location information of the first mobile device at a second accuracy level. The first accuracy level is higher than the second accuracy level.

One embodiment includes a method performed as part of a location sharing application at a first mobile device. The first mobile device includes a global positioning system (GPS) processor for determining a location of the first mobile device and at least one additional processor for determining the location of the first mobile device. The method comprises determining the location of the first mobile and activating the GPS processor for determining the location of the first mobile device based on whether the location of the first mobile device is being accessed at a second mobile device.

Figure 7:
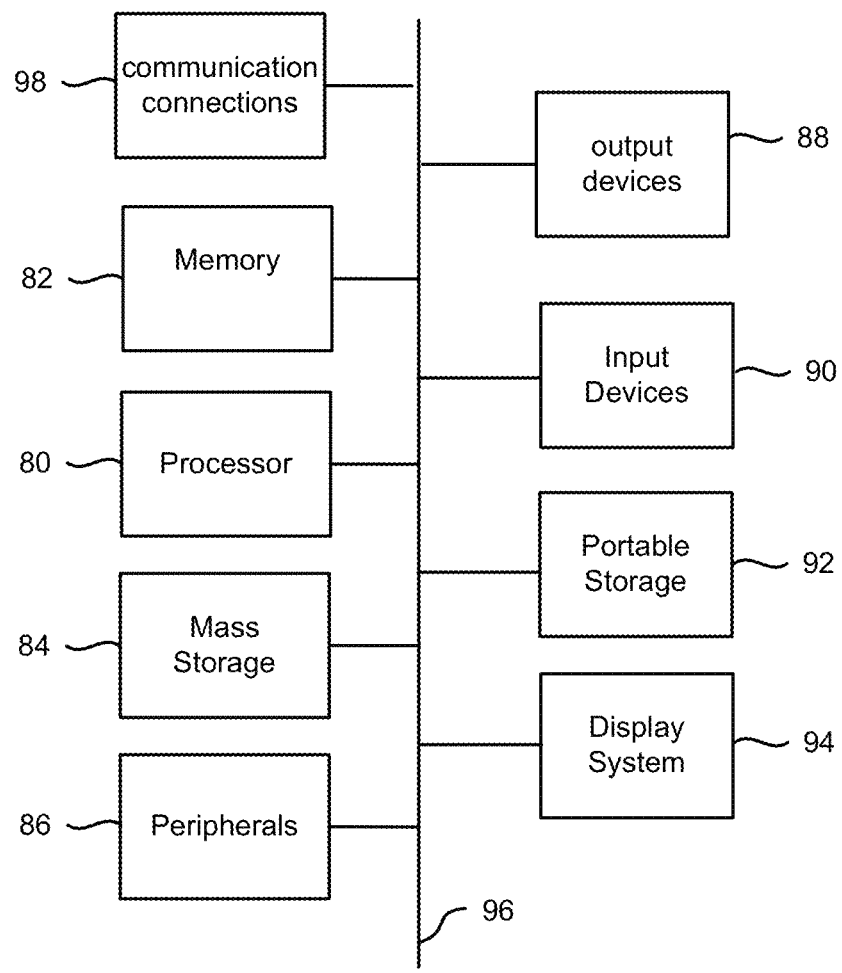
FIG. 7 is a simplified block diagram of a computing device that can be used to implement various embodiments of the disclosed technology.

FIG. 7 is a high level block diagram of a computing system which can be used to implement any of the computing devices of FIGS. 1 and 2. The computing system of FIG. 7 includes processor 80, memory 82, mass storage device 84, peripherals 86, output devices 88, input devices 90, portable storage 92, and display system 94. For purposes of simplicity, the components shown in FIG. 7 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements.

Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 7. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 7 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 7 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein, including the various engines and managers, can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include non-transitory, tangible computer readable media such as volatile and non-volatile media, removable and non-removable media. Tangible computer readable media may be implemented in any method or technology for storage of information such as computer readable instructions, data structures, program modules or other data. Examples of tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory, tangible medium which can be used to store the desired information and which can be accessed by a computer. In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more tangible computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of sharing location information between computing devices, comprising:
   determining first location information for a first client device using a first location protocol;
   receiving tracking information associated with a second client device, the tracking information including an indication that the second client device has an interest in a location of the first client device;
   in response to the indication that the second client device has the interest in the location of the first client device, initiating a location protocol change at the first client device;
   determining second location information for the first client device using a second location protocol after initiating the location protocol change, the second location protocol having a higher accuracy than the first location protocol; and
   stopping the determining second location information for the first client device using the second location protocol after a threshold time following determining second location information for the first client device using the second location protocol.

2. A method according to claim 1, further comprising:
   receiving a push protocol message from the second client device or a location sharing platform, the push protocol message including the tracking information.

3. A method according to claim 2, wherein the push protocol message is a voice over internet protocol message.

4. A method according to claim 1, further comprising:
   receiving a push protocol message from a location sharing platform; and
   issuing a request to the location sharing platform in response to the push protocol message;
   wherein the tracking information is received from the location sharing platform in response to the request.

5. A method according to claim 1, further comprising:
   periodically polling the second client device or a location sharing platform for the tracking information.

6. A method according to claim 1, further comprising:
   sending the first location information to the second client device; and
   sending the second location information to the second client device;
   wherein the tracking information associated with the second client device is received from the second client device.

7. A method according to claim 1, further comprising:
   sending the first location information to a location sharing platform; and
   sending the second location information to the location sharing platform;
   wherein the tracking information associated with the second client device is received from the location sharing platform.

8. A method according to claim 1, further comprising:
   determining from the tracking information that the second client device is more than a threshold distance from the first client device;
   in response to determining that the second client device is more than the threshold distance from the first client device, determining the second location information using the second location protocol then determining third location information for the first client device using the first location protocol; and
   sending the third location information to a location sharing platform or the second client device.

9. A method according to claim 1, further comprising:
   determining from the tracking information that the second client device is not more than a threshold distance from the first client device;
   in response to determining that the second client device is not more than the threshold distance from the first client device, determining from the tracking information whether the second client device is moving toward the first client device;
   if the second client device is not moving toward the first client device, determining the second location information using the second location protocol then determining third location information for the first client device using the first location protocol; and
   sending the third location information to a location sharing platform or the second client device.

10. A method according to claim 9, further comprising:
    if the second client device is moving toward the first client device, determining whether the first client device has been using the second location protocol for more than a threshold time period;
    if the first client device has been using the second location protocol for more than the threshold time period, setting the first client device to use the first location protocol for a minimum amount of time; and
    if the first client device has not been using the second location protocol for more than the threshold time period, determining the second location information using the second location protocol.

11. A method according to claim 1, further comprising:
    determining at the first client device third location information for the first client device using the first location protocol after the threshold time following determining second location information for the first client device using the second location protocol.

12. A method according to claim 1, wherein:
    determining first location information for a first client device using a first location protocol comprises receiving at a first server the first location information from the first client device; and
    determining second location information for the first client device using a second location protocol comprises receiving at the first server the second location information from the first client device.

13. A method according to claim 12, wherein:
    determining first location information for the first client device using the first location protocol comprises sending a first instruction from the first server to the first client device to determine the first location information using the first location protocol; and initiating the location protocol change at the first client device and determining second location information comprises sending a second instruction from the first server to the first client device to determine the second location information using the second location protocol.

14. A method according to claim 13, wherein:
the first instruction causes the first client device to determine the first location information using a first location mechanism on the first client device; and
the second instruction causes the first client device to determine the second location information using a second location mechanism on the first client device.

15. A method according to claim 14, wherein:
the first location mechanism includes a global positioning system (GPS) receiver; and
the second location mechanism includes a cellular identification mechanism.

16. A method according to claim 1, wherein:
determining first location information for a first client device using a first location protocol comprises determining the first location information at the first client device; and
determining second location information for the first client device using a second location protocol comprises determining the second location information at the first client device.

17. A method according to claim 16, wherein:
receiving tracking information associated with a second client device comprises receiving at the first client device the tracking information from the second client device.

18. A method according to claim 17, wherein:
initiating a location protocol change at the first client device comprises initiating the location protocol change by the first client device.

19. A method of sharing location information between computing devices, comprising:
determining first location information for a first client device using a first location protocol;
receiving tracking information associated with a second client device;
determining from the tracking information that the second client device has indicated an interest in the location of the first client device and is more than a threshold distance from the first client device;
in response to the tracking information, determining second location information for the first client device using a second location protocol, then determining third location information for the first client device using the first location protocol, the second location protocol having a higher accuracy than the first location protocol; and
sending the third location information to a location sharing platform or the second client device.

20. A method according to claim 19, further comprising:
sending the first location information to the second client device; and
sending the second location information to the second client device;
wherein sending the third location information comprises sending the third location information to the second client device; and
wherein the tracking information associated with the second client device is received from the second client device.

21. A method according to claim 19, further comprising:
sending the first location information to the location sharing platform; and
sending the second location information to the location sharing platform;
wherein sending the third location information comprises sending the third location information to the location sharing platform; and
wherein the tracking information associated with the second client device is received from the location sharing platform.

22. A method according to claim 19, wherein:
determining first location information for a first client device using a first location protocol comprises receiving at a first server the first location information from the first client device;
determining second location information for the first client device using a second location protocol comprises receiving at the first server the second location information from the first client device;
determining third location information for the first client device using the first location protocol comprises receiving at the first server the third location information from the first client device.

23. A method according to claim 22, wherein:
determining first location information for the first client device using the first location protocol comprises sending a first instruction from the first server to the first client device to determine the first location information using the first location protocol;
determining second location information for the first client device using the second location protocol comprises sending a second instruction from the first server to the first client device to determine the second location information using the second location protocol; and
determining third location information for the first client device using the first location protocol comprises sending a third instruction form the first server to the first client device to determine the third location information using the first location protocol.

24. A method according to claim 19, wherein:
determining first location information for a first client device using a first location protocol comprises determining the first location information at the first client device;
determining second location information for the first client device using a second location protocol comprises determining the second location information at the first client device; and
determining third location information for the first client device using the first location protocol comprises determining the third location information at the first client device.

25. A method according to claim 24, wherein:
receiving tracking information associated with a second client device comprises receiving at the first client device the tracking information associated with the second client device.

26. A method of sharing location information between computing devices, comprising:
determining first location information for a first client device using a first location protocol;
receiving tracking information associated with a second client device;
determining from the tracking information that the second client device has indicated an interest in the location of the first client device and that the second client device is not more than a threshold distance from the first client device;

in response to the tracking information, determining second location information for the first client device using a second location protocol, the second location protocol having a higher accuracy than the first location protocol;

in response to determining that the second client device is not more than the threshold distance from the first client device, determining from the tracking information whether the second client device is moving toward the first client device;

if the second client device is not moving toward the first client device, determining third location information for the first client device using the first location protocol after determining the second location information using the second location protocol; and sending the third location information to a location sharing platform or the second client device.

27. A method according to claim 26, further comprising:
if the second client device is moving toward the first client device, determining whether the first client device has been using the second location protocol for more than a threshold time period;
if the first client device has been using the second location protocol for more than the threshold time period, setting the first client device to use the first location protocol for a minimum amount of time; and
if the first client device has not been using the second location protocol for more than the threshold time period, determining the second location information using the second location protocol.

28. A method according to claim 26, further comprising:
sending the first location information to the second client device;
sending the second location information to the second client device;
wherein sending the third location information comprises sending the third location information to the second client device;
wherein the tracking information associated with the second client device is received from the second client device.

29. A method according to claim 26, further comprising:
sending the first location information to the location sharing platform; and
sending the second location information to the location sharing platform;
wherein sending the third location information comprises sending the third location information to the location sharing platform; and wherein the tracking information associated with the second client device is received from the location sharing platform.

30. A method according to claim 26, wherein:
determining first location information for a first client device using a first location protocol comprises receiving at a first server the first location information from the first client device;
determining second location information for the first client device using a second location protocol comprises receiving at the first server the second location information from the first client device; and
determining third location information for the first client device using the first location protocol comprises receiving at the first server the third location information from the first client device.

31. A method according to claim 30, wherein:
determining first location information for the first client device using the first location protocol comprises sending a first instruction from the first server to the first client device to determine the first location information using the first location protocol; and
determining second location information comprises sending a second instruction from the first server to the first client device to determine the second location information using the second location protocol;
determining third location information for the first client device comprises sending a third instruction from the first server to the first client device to determine the third location using the first location protocol.

32. A method according to claim 26, wherein:
determining first location information for a first client device using a first location protocol comprises determining the first location information at the first client device;
determining second location information for the first client device using a second location protocol comprises determining the second location information at the first client device; and
determining third location information for the first client device using the first location protocol comprises determining the third location information at the first client device.

33. A method according to claim 32, wherein:
receiving tracking information associated with a second client device comprises receiving at the first client device the tracking information associated with the second client device.

* * * * *